(12) United States Patent
Halliwell et al.

(10) Patent No.: US 10,065,488 B2
(45) Date of Patent: Sep. 4, 2018

(54) TRIM PANEL

(71) Applicant: Jaguar Land Rover Limited, Whitley, Coventry, Warwickshire (GB)

(72) Inventors: Martin Halliwell, Wheatley (GB); Martin Boonham, Gloucestershire (GB); David Butlin, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 180 days.

(21) Appl. No.: 15/021,201

(22) PCT Filed: Sep. 12, 2014

(86) PCT No.: PCT/EP2014/069506
§ 371 (c)(1),
(2) Date: Mar. 10, 2016

(87) PCT Pub. No.: WO2015/036547
PCT Pub. Date: Mar. 19, 2015

(65) Prior Publication Data
US 2016/0221426 A1   Aug. 4, 2016

(30) Foreign Application Priority Data

Sep. 12, 2013 (GB) .................................. 1316247.4

(51) Int. Cl.
*B60J 10/86* (2016.01)
*B60R 13/02* (2006.01)
(Continued)

(52) U.S. Cl.
CPC ............... *B60J 10/86* (2016.02); *B60J 10/50* (2016.02); *B60R 13/0243* (2013.01);
(Continued)

(58) Field of Classification Search
CPC ....... B60J 10/86; B60J 10/50; B60R 13/0243; B60R 13/07; B60R 13/08; B60R 13/0815
(Continued)

(56) References Cited

U.S. PATENT DOCUMENTS 2,817,535 A    11/1953   Linzell
4,445,721 A  *  5/1984   Yaotani .................. B60J 5/0418
                                                   296/154
(Continued)

FOREIGN PATENT DOCUMENTS

DE         1021680 B     12/1957
DE         19501292       7/1996
(Continued)

OTHER PUBLICATIONS

Combined Search and Examination Report corresponding to application No. GB1316247.4, dated Apr. 23, 2014, 5 pages.
(Continued)

*Primary Examiner* — Joseph Pape
(74) *Attorney, Agent, or Firm* — Reising Ethington P.C.

(57) ABSTRACT

A vehicle door trim panel (1) is provided with a water drainage portion constituted by an upper wall (3) and a lower wall (4). The upper wall (3) is provided with a water inlet aperture (8), and the lower wall (4) is provided with a water outlet aperture (9). The invention also relates to a vehicle door, and a vehicle.

17 Claims, 2 Drawing Sheets

(51) Int. Cl.
*B60R 13/07* (2006.01)
*B60R 13/08* (2006.01)
*B60J 10/50* (2016.01)

(52) U.S. Cl.
CPC .............. *B60R 13/07* (2013.01); *B60R 13/08* (2013.01); *B60R 13/0815* (2013.01)

(58) Field of Classification Search
USPC .............................................. 296/208, 146.5
See application file for complete search history.

(56) References Cited

U.S. PATENT DOCUMENTS

| | | | |
|---|---|---|---|
| 5,462,482 A | 10/1995 | Grimes | |
| 6,412,852 B1* | 7/2002 | Koa | B60R 13/0206 296/146.5 |
| 7,036,868 B2 | 5/2006 | Kohara et al. | |
| 7,111,894 B2* | 9/2006 | Kora | B60J 5/0416 296/146.1 |
| 7,597,382 B2* | 10/2009 | Vilcek | B29C 44/18 296/187.02 |
| 7,621,373 B2* | 11/2009 | Helferty | B60R 13/0815 181/264 |
| 8,585,126 B1* | 11/2013 | Shen | B60J 5/0418 296/154 |
| 2003/0184121 A1* | 10/2003 | Czaplicki | B29C 44/18 296/187.02 |

FOREIGN PATENT DOCUMENTS

| | | | |
|---|---|---|---|
| DE | 19501292 A1 | 7/1996 | |
| DE | 10062162 A1 | 6/2002 | |
| DE | 10216870 A1 * | 11/2003 | ............. B60R 13/07 |
| DE | 102008003896 A1 | 7/2009 | |
| EP | 1514712 A2 | 3/2005 | |
| JP | 2010012886 A | 1/2010 | |

OTHER PUBLICATIONS

International Search Report corresponding to International Application No. PCT/EP2014/069506, dated Feb. 5, 2015, 4 pages.
Written Opinion corresponding to International Application No. PCT/EP2014/069506, dated Feb. 5, 2015, 6 pages.

* cited by examiner ated the noise attenuation of the
TRIM PANEL

TECHNICAL FIELD

The present invention relates to a trim panel for a vehicle door, to a vehicle door incorporating such a trim panel, and to a vehicle incorporating at least one such vehicle door.

BACKGROUND OF THE INVENTION

A vehicle door typically has an outer door panel, an inner door panel and a trim panel. The inner door panel supports door furniture such as a lock and window control equipment, and the trim panel provides a decorative appearance to the interior of the door. The door is usually provided with primary and secondary seals for sealing the door against the ingress of water when the door is closed. A drainage hole may be formed in the lower region of the door so that water collecting inside the door, for example water entering via a window in the door, can drain away directly to the outside. Unfortunately, the provision of such a drain hole provides an acoustic path for noise transmission from the outside to the passenger cabin of the vehicle. Typically, such noise is road noise generated by the adjacent vehicle tire and/or wind noise. This noise is known as noise vibration and harshness (NVH).

At least in certain embodiments, the present invention sets out to reduce NVH sound transmission to the passenger cabin of a vehicle via a door of the vehicle.

SUMMARY OF THE INVENTION

Aspects of the present invention relate to a trim panel, a vehicle door incorporating such a trim panel, and a vehicle incorporating at least one such door.

A further aspect of the invention relates to a trim panel for a vehicle door, the trim panel being provided with a water drainage portion configured to attenuate noise, wherein the drainage portion is constituted by an upper wall having a water inlet aperture and a lower wall having a water outlet aperture.

The drainage portion is constituted by an upper wall and a lower wall. The provision of the upper and lower walls can attenuate noise. The water outlet aperture can be off-set with respect to the water inlet aperture. The off-set arrangement of the water outlet aperture and the water inlet aperture can also attenuate noise.

The trim panel can be constituted by a substantially upright main body portion and an outwardly-extending base portion. The base portion can incorporate the water drainage portion.

The upper and lower walls of the drainage portion can be arranged substantially parallel to each other.

The trim panel can be a one-piece injection moulded member, for example made of a thermoplastics material, such as polypropylene.

A channel formed between the upper and lower walls of the drainage portion in the region between the apertures can form part of a labyrinth path for draining water from the inlet aperture to the exterior via the outlet aperture. This labyrinth path can act as a noise attenuator.

The channel formed between the upper and lower walls of the drainage portion in the region between the apertures can be at least partially filled with a sound-absorbing material. This material can increase the noise attenuation of the drainage portion.

The sound-absorbing material can be constituted by an open-cell foam material such as an open-cell polyurethane foam material.

Alternatively, the sound-absorbing material can be constituted by a closed-cell foam material such as a closed-cell polyurethane foam material. A groove can be provided in the sound-absorbing material for the passage of water from the inlet aperture to the outlet aperture along said channel.

The channel formed between the upper and lower walls of the drainage portion in the region between the apertures can be provided with a plurality of ribs extending alternately from the upper and lower walls, thereby substantially increasing the labyrinth path, and hence the noise attenuation. The ribs can be formed integrally with the upper wall and/or the lower wall.

The free edge of at least one of the upper and lower walls can be provided with an adhesive strip for bonding the trim panel to an adjacent vehicle door inner panel.

According to a further aspect of the present invention there is provided a vehicle door trim panel is provided with a water drainage portion constituted by an upper wall and a lower wall; the upper wall is provided with a water inlet aperture, and the lower wall is provided with a water outlet aperture; the water outlet aperture being off-set with respect to the water inlet aperture.

In a further aspect of the present invention there is provided a vehicle door comprising an outer panel, an inner panel and a trim panel, the trim panel being as defined above.

The inner panel can be mechanically fastened to the outer panel. For example, an edge of the outer panel can be folded around the inner panel to form a hem. The trim panel can be bonded and/or press-fitted to the inner panel, thereby forming an integrated door structure.

In yet a further aspect, the present invention relates to a vehicle incorporating at least one vehicle door as defined above.

The water drainage portion of the trim panel of the or each vehicle door can overlie a respective door sill forming part of the vehicle bodywork when the vehicle door incorporating that trim panel is closed.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

An embodiment of the present invention will now be described, by way of example only, with reference to the accompanying drawings, in which.

DETAILED DESCRIPTION OF AN EMBODIMENT

Figure 1:
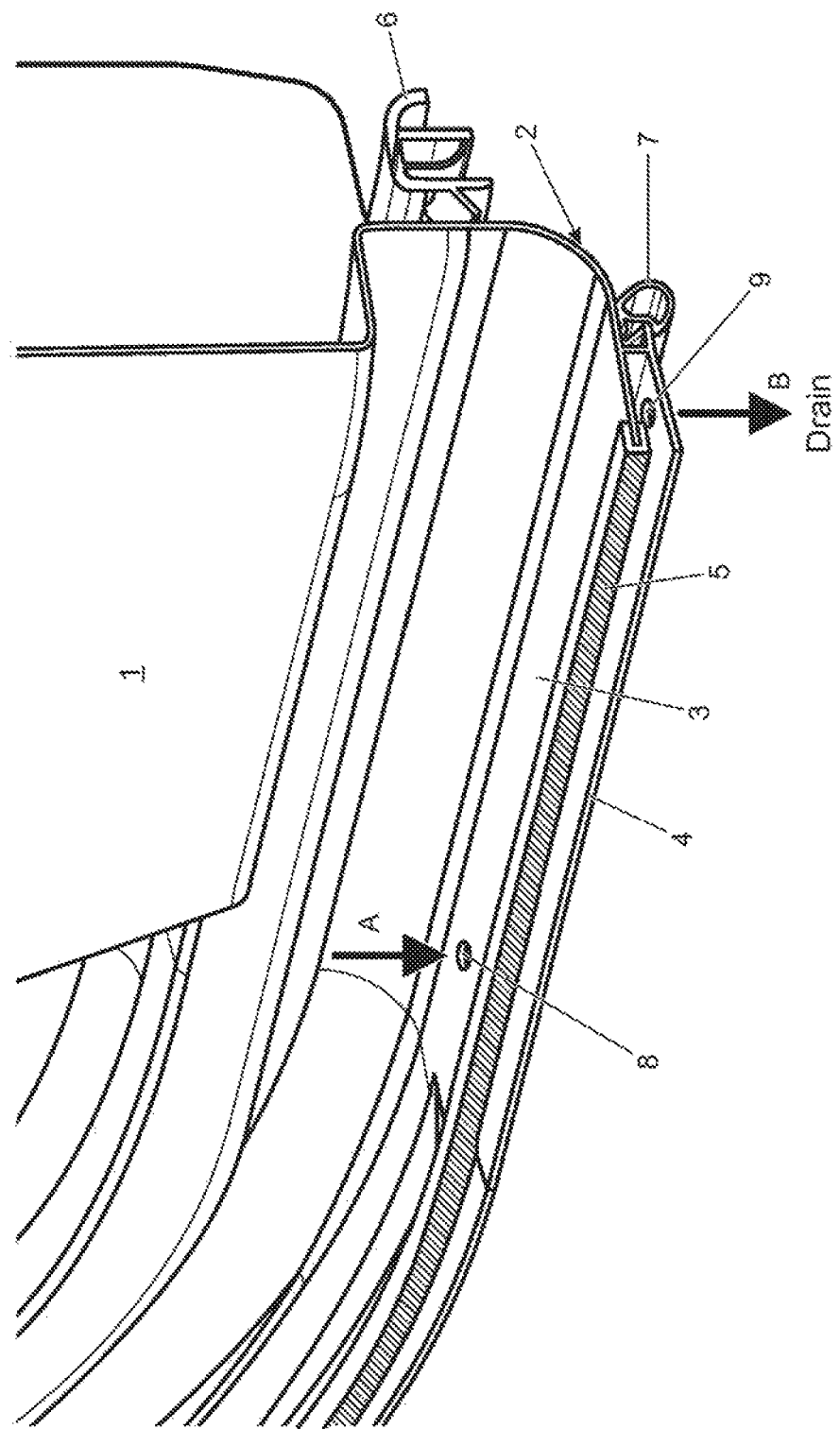
FIG. 1 is a perspective view of a vehicle door trim panel incorporating a twin wall NVH sound transmission barrier.

Referring to the drawings, FIG. 1 shows the lower portion of a trim panel 1 for a vehicle door. The trim panel is a unitary component formed by injection moulding a thermoplastics material such as polypropylene. The lower portion of the trim panel 1 is provided with an outwardly-extending base portion 2 which overlies an associated door sill (not shown) forming part of the vehicle bodywork when the door is closed. The base portion 2 is formed by a twin wall structure having an upper wall 3 and a lower wall 4 parallel to the upper wall. The lower portion of the trim panel is bonded to an inner door panel (not shown) by a resilient seal 5 which extends along the upper wall 3. The upper portion of the trim panel is fixed to the inner panel by any suitable means such as press-fitting or bonding. The inner door panel is fixed to an outer door panel (not shown) by any suitable means such as press-fitting or bonding. The trim panel 1 and the two door panels thus form an integrated door structure. The trim panel 1 is sealed with respect to the vehicle bodywork by a primary seal 6 fixed to the bodywork, and by a secondary seal 7 mounted on the trim panel.

In order to prevent water emanating from a window provided in the vehicle door from entering the passenger cabin, the upper wall 3 of the base portion 2 of the trim panel 1 is formed with an aperture 8, and the lower wall 4 is provided with an aperture 9. The aperture 9 is offset rearwardly with respect to the aperture 8. Thus, water can enter the twin wall structure as shown by the arrow A, and can leave the twin wall structure as shown by the arrow B. The aperture 8 is remote from the exterior of the door, whereas the aperture 9 leads directly to the exterior of the door. The two apertures 8 and 9 and the channel between the upper and lower walls 3 and 4 in the region between the two apertures thus forms a labyrinth path for the passage of water from the vehicle door window to the outside of the vehicle. As the two apertures 8 and 9 are offset, there is no direct path for road and wind noise to reach the passenger cabin from the outside of the vehicle. This twin wall arrangement thus provides means for attenuating noise and an effective barrier for NVH sound transmission reduction.

Figure 2:
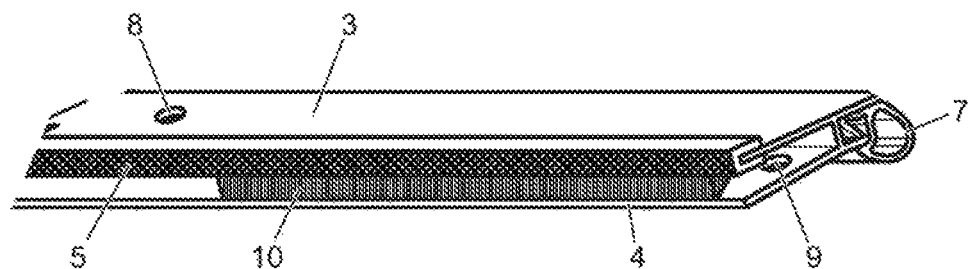
FIGS. 2 to 4 are perspective views of modified forms of the twin wall barrier showing alternative ways of increasing the attenuation provided by the barrier.
Figure 3:
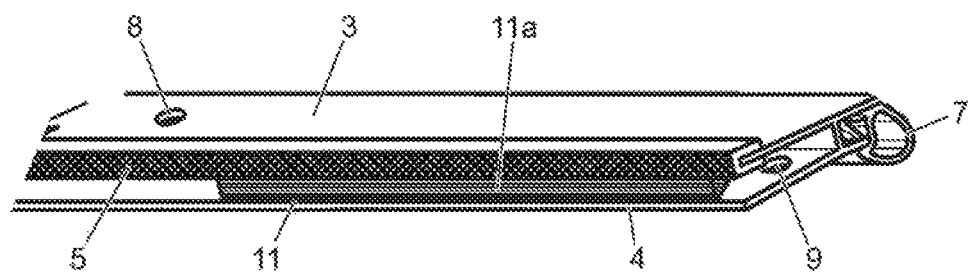
Figure 4:
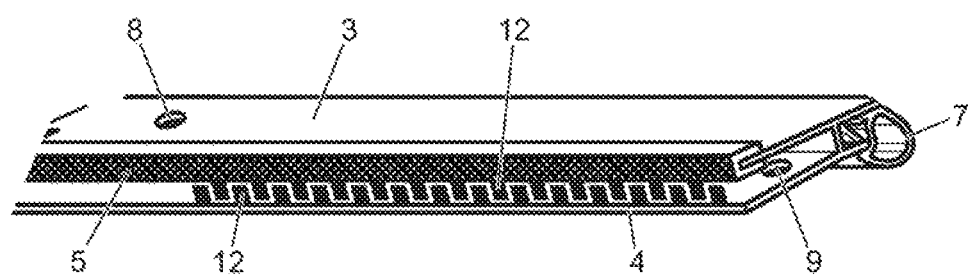

FIGS. 2 to 4 show alternative ways of further reducing NVH sound transmission. In particular, FIG. 2 shows the provision of an open-cell foam filler 10 in the channel between the upper and lower walls 3 and 4 in the region between the two apertures 8 and 9. This filler 10 enhances the sound reducing properties of the twin wall structure, and so enhances its NVH sound transmission reduction properties. The filler 10 is an open-cell polyurethane foam which has good sound attenuation properties. The open-cell structure of the filler 10 ensures that water entering the twin wall structure via the upper aperture 8 can flow along the channel between the upper and lower walls 3 and 4 in the region between the two apertures 8 and 9, and then exit via the lower aperture 9.

FIG. 3 shows an alternative to the use of an open-cell filler, namely the provision of a closed-cell foam filler 11 such as a closed-cell polyurethane foam. This filler 11 enhances the sound reducing properties of the twin wall structure, and so enhances its NVH sound transmission reduction properties. In order to permit the flow of water entering the twin wall structure via the upper aperture 8 along the channel between the upper and lower walls 3 and 4 in the region between the two apertures 8 and 9, the filler 11 is formed with a groove 11a.

FIG. 4 shows yet another way of further reducing NVH sound transmission through the twin wall structure. The twin wall structure is formed with staggered ribs 12 which are moulded integrally with the trim panel 1. The ribs 12 increase the labyrinth path in the gap between the upper and lower walls 3 and 4 in the region between the two apertures 8 and 9, and so enhance its NVH sound transmission reduction properties. The staggered arrangement of the ribs 12 ensures that water can flow along the gap between the upper and lower walls 3 and 4 in the region between the two apertures 8 and 9.

It will be apparent that modifications could be made to the trim panel 1 described above. For example, the trim panel 1 could be made of any suitable thermoplastics material, and could be formed by any suitable process other than injection moulding. It could also be made of a metal, such as aluminium. Similarly, the open-cell foam material could be any suitable open-cell foam material, and the closed-cell foam material could be any suitable closed-cell foam material.

The invention claimed is:

1. A door trim panel for a door of a vehicle, the door trim panel being provided with a water drainage portion, wherein the drainage portion is constituted by an upper wall having a water inlet aperture and a lower wall having a water outlet aperture, the water outlet aperture being off-set with respect to the water inlet aperture to create an indirect path for noise to reach an inside of the vehicle from an outside of the vehicle.

2. The door trim panel as claimed in claim 1, wherein the door trim panel is constituted by a substantially upright main body portion and an outwardly-extending base portion, the base portion incorporating the water drainage portion.

3. The door trim panel as claimed in claim 1, wherein upper and lower walls of the drainage portion are arranged substantially parallel to each other.

4. The door trim panel as claimed in claim 1, wherein the door trim panel is a one-piece injection moulded member made of a thermoplastics material.

5. The door trim panel as claimed in claim 1, wherein a channel is formed between the upper and lower walls of the drainage portion in a region between the apertures, the channel forming part of a labyrinth path for draining water from the inlet aperture to the outside of the vehicle via the outlet aperture.

6. The door trim panel as claimed in claim 5, wherein a channel formed between the upper and lower walls of the drainage portion in the region between the apertures is at least partially filled with a sound-absorbing material.

7. The door trim panel as claimed in claim 6, wherein the sound-absorbing material is constituted by an open-cell foam material.

8. The door trim panel as claimed in claim 7, wherein the open-cell foam material is an open-cell polyurethane foam material.

9. The door trim panel as claimed in claim 6, wherein the sound-absorbing material is constituted by a closed-cell foam material, and is provided with a groove for the passage of water from the inlet aperture to the outlet aperture along said channel.

10. The door trim panel as claimed in claim 9, wherein the closed-cell foam material is a closed-cell polyurethane foam material.

11. The door trim panel as claimed in claim 5, wherein the channel formed between the upper and lower walls of the drainage portion in the region between the apertures is provided with a plurality of ribs extending alternately from the upper and lower walls, thereby substantially increasing the labyrinth path.

12. The door trim panel as claimed in claim 11, wherein the ribs are formed integrally with the upper wall or the lower wall.

13. The door trim panel as claimed in claim 1, wherein a free edge of at least one of the upper and lower walls is provided with an adhesive strip for bonding the door trim panel to an adjacent vehicle door inner panel.

14. A vehicle door comprising an outer panel, an inner panel and a door trim panel, the door trim panel being as claimed in claim 1.

15. The vehicle door as claimed in claim 14, wherein the inner panel is bonded or press-fitted to the outer panel, and the door trim panel is bonded or press-fitted to the inner panel, thereby forming an integrated door structure.

16. A vehicle incorporating at least one vehicle door as claimed in claim 14.

17. The door trim panel as claimed in claim 5, wherein the thermoplastics material is polypropylene.

* * * * *